United States Patent [19]

Hirsch

[11] Patent Number: 4,510,106
[45] Date of Patent: Apr. 9, 1985

[54] PROCESS AND APPARATUS FOR PRE-FOAMING SYNTHETIC PLASTICS

[76] Inventor: Kurt Hirsch, Linsengasse 55, 9020 Klagenfurt, Kärnten, Austria

[21] Appl. No.: 551,858

[22] Filed: Nov. 15, 1983

[30] Foreign Application Priority Data

Nov. 15, 1982 [AT] Austria .................................. 4154/82

[51] Int. Cl.³ .................. B29D 27/00; F26B 13/30
[52] U.S. Cl. ...................................... 264/53; 264/101; 264/DIG. 9; 264/DIG. 15; 34/92
[58] Field of Search .......... 264/53, DIG. 9, DIG. 15, 264/101; 34/92

[56] References Cited

U.S. PATENT DOCUMENTS

| | | | |
|---|---|---|---|
| 2,986,537 | 5/1961 | Chaumeton | 264/DIG. 15 |
| 3,013,996 | 12/1961 | Pollard et al. | 264/DIG. 15 |
| 3,126,432 | 3/1964 | Schuur | 264/53 |
| 3,207,820 | 9/1965 | Scarvelis et al. | 264/DIG. 9 |
| 3,347,961 | 10/1967 | Russell | 264/53 |
| 3,577,360 | 5/1971 | Immel | 264/DIG. 9 |
| 3,631,133 | 12/1971 | Battigelli | 264/DIG. 15 |
| 3,963,816 | 6/1976 | Smith | 264/DIG. 9 |
| 4,272,469 | 6/1981 | Smith | 264/53 |

FOREIGN PATENT DOCUMENTS 295671 3/1971 U.S.S.R. ........................ 264/DIG. 9

Primary Examiner—Philip Anderson
Attorney, Agent, or Firm—Bert J. Lewen

[57] ABSTRACT

A process of pre-foaming blowing agent-containing plastic materials, in which the plastic material particles which have been pre-foamed by the addition of heat are transferred without an intermediate resting stage from a sealed pre-foaming chamber into a drying and stabilizing chamber, with a vacuum being maintained during the drying and stabilizing operation.

An apparatus for the performance of the process includes a pre-foaming chamber, beneath which there is provided a chamber in which the pre-foamed plastic material is dried and stabilized. The charging opening of the drying and stabilizing chamber is directly under the discharge opening of the pre-foaming chamber and is hermetically sealable by means of a slide valve.

8 Claims, 1 Drawing Figure

U.S. Patent
Apr. 9, 1985
4,510,106
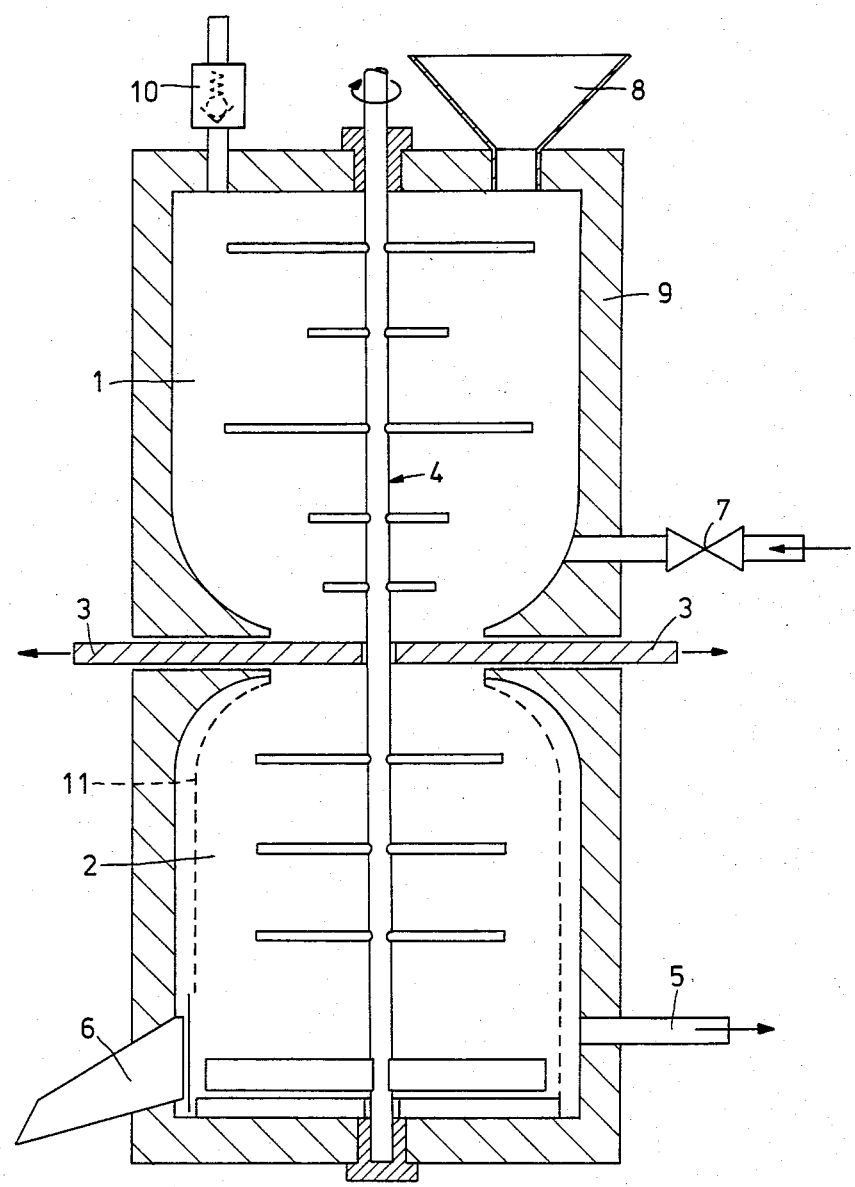

PROCESS AND APPARATUS FOR PRE-FOAMING SYNTHETIC PLASTICS

The invention relates to a process for pre-foaming blowing agent-containing synthetic plastics such as, for example, polystyrene, in which process the granular plastic material is subjected to heat by means of water vapor or steam and is pre-foamed while being stirred, after which the pre-foamed plastic particles are dried and stabilized.

At the present time polystyrene containing, by way of example, pentane as the propellant, is pre-foamed in three stages, with the three stages then having to be repeated if particularly low bulk densities are sought to be achieved. The three stages are constituted by, first foaming the plastic material with steam, then drying the pre-foamed plastic material with hot air, and finally the stabilizing of the pre-foamed plastic material in silos. Up to the further processing of the pre-foamed plastic material into the desired end products, the known pre-foaming process consumes from about 8 to 12 hours.

A further disadvantage of the known process resides in the fact that the hot, pre-foamed plastic material particles are exceptionally sensitive and the danger exists that prior to their being stabilized, during which operation in essence the plastic material particles, while their outer skin is being hardened, are cooled and free blowing agent gas is removed, collapse into themselves to a greater or lesser extent, so that to a greater or smaller extent the effect of the foaming is lost.

The objective of the invention is to provide a process for pre-foaming plastics which can be performed in less time than the known processes and during which there is no risk of the pre-foamed plastic material particles collapsing into themselves prior to their stabilization.

In accordance with the invention this objective is attained in a process of the above-mentioned type by virtue of the fact that the pre-foamed plastic material particles are conducted without any intermediate resting stage from a closed pre-foaming chamber into a drying and stabilizing chamber, that in this chamber during the drying and stabilizing operation a low pressure or vacuum is maintained, and that the so pre-foamed, dried and stabilized plastic material particles are then preferably directly conducted to the further processing stage.

Through implementation of the process according to the invention the pre-foamed plastics particles are conducted from the pre-foaming chamber into the drying and stabilizing chamber while being protected from external influences. By means of the low pressure maintained in the drying and stabilizing chamber, furthermore, the drying and stabilizing of the pre-foamed plastic material particles proceeds rapidly and yet carefully.

Preferably the process according to the present invention can be so performed that a vacuum is established in the drying and stabilizing chamber even prior to the introduction of the pre-foamed plastic material particles thereinto, with the vacuum being preferably increased during the drying and stabilizing operation. In this variant of the process the danger of collapsing of the pre-foamed hot plastic material particles is even further inhibited.

According to a variant of the process of the invention, the pre-foamed plastic material particles are stirred during the drying and stabilizing operation.

An especially careful transfer of the pre-foamed plastic material particles into the drying and stabilizing chamber is achieved in accordance with the invention when the pre-foamed plastic material particles are permitted to fall freely from the pre-foaming chamber into the chamber in which they will be dried and stabilized.

An apparatus for practicing the process with the aid of a pre-foaming chamber which is provided with an opening for the charging of the granular plastics material, a steam inlet opening, a pressure relief valve, a stirring mechanism and a discharge opening for the pre-foamed plastic material particles, in accordance with the invention is characterized in that under the pre-foaming chamber there is provided a chamber with a charging opening and a discharging opening in which chamber the pre-foamed plastic material is dried and stabilized, in that the charging opening of this chamber is arranged directly under the discharge opening of the pre-foaming chamber, in that the charging opening is, for example, adapted to be hermetically sealed by means of a slide valve or gate, in that in the chamber a stirring mechanism is provided, and in that a vacuum pump or conduit is connected with the chamber.

In a refinement of the apparatus according to the invention the same can be further characterized by the fact that in the drying and stabilizing chamber at a spacing from the wall thereof there is arranged a cage for receiving the plastic material to be dried and stabilized.

Further details and characteristics of the invention will become clear from the following description of the example of a device for practicing the process of the present invention shown schematically in the drawing.

The apparatus according to the invention includes in a common insulated housing 9 a pre-foaming chamber 1 and a stabilizing and drying chamber 2. The transfer path from the foaming chamber 1 to the stabilizing and drying chamber 2 can be selectively opened or closed by means of a slide valve 3. For this purpose, fluid pressure cylinders, for example, can be provided.

The pre-foaming chamber 1 is provided with a charging hopper 8, a steam inlet duct 7 and a pressure relief valve 10. Interiorly of the pre-foaming chamber 1 there is provided a stirring mechanism 4, which also extends into the stabilizing and drying chamber 2. The stirring mechanism 4 is driven by means of a suitable drive motor (not shown).

The stabilizing and drying chamber 2 is provided with a cagelike, i.e. an air-permeable, container 11 arranged at a spacing from the wall of the housing 9. The pre-foamed plastic material particles coming from the pre-foaming chamber enter into this container 11 in order to be there stabilized and dried.

The stabilizing and drying chamber 2 is further provided with a material discharge device 6 and a connection 5 for a vacuum pump, so that a low pressure or vacuum can be established in the stabilizing and drying chamber 2.

The process according to the invention is performed as follows:

The plastic material to be pre-foamed, or pre-expanded, e.g. a batch of polystyrene beads having particle sizes ranging from about 0.4 to about 1.6 mm and a bulk density of between about 550 and 600 Kg/m$^3$, containing about 7% pentane as a blowing agent and having a moisture content of about 0.5%, is introduced into the pre-foaming or pre-expanding chamber 1, the chamber being heated to a wall temperature of between about 80° and 90° C. by means of steam admitted into the chamber via the duct 7.

While they are in the chamber 1, with the slide gate or valve 3 hermetically sealed, the polystyrene beads are agitated by the stirring mechanism 4 located in the chamber, the mechanism being driven at a rotary speed of about 60 revolutions per minute. During this interval, the temperature of the beads rises to between about 100° and 120° C. and they are pre-expanded or pre-foamed, i.e. the duration of the pre-foaming operation and the temperature are so chosen that at the end of the said interval the plastic material particles still retain a residual degree of foamability or expandability.

After completion of the pre-foaming operation as described, the chamber 1 is evacuated to a residual pressure of 0.8 bar, which is substantially the same pressure as is established in the drying and stabilizing chamber 2, whereupon the slide valve or gate 3 is opened and the pre-foamed plastic material is transferred into the stabilizing and drying chamber by being permitted to fall freely into the latter. As soon as all the particles are in the chamber 2, the slide gate is again hermetically sealed and the particles, while being agitated by the lower section of the stirring mechanism 4 running at 60 revolutions per minute, are subjected to a drying temperature of about 25° to 30° C. for a period of between 10 and 60 seconds, with a substantial part of the heat being provided by the substances, i.e. the polystyrene beads or particles, the hot blowing agent and the hot water vapor, entering the chamber 2 from the chamber 1. Because of the vacuum established in the chamber 2 via the conduit 5, which may be already pre-existing degree of vacuum or one that is increased after the chamber is reclosed, the stabilizing and drying of the pre-foamed plastic material proceeds especially rapidly and at the same time carefully so that the expanded particles cannot collapse or lose a major portion of their attained degree of pre-expansion. The stabilized, pre-expanded or pre-foamed particles are ultimately taken from the chamber 2 at a temperature of about 25° C. and are found to have a bulk density of about 7 to 9 $Kg/m^3$ and an average particle size of about 4 to 8 mm.

While the plastic material particles are being stabilized and dried in the chamber 2, of course, a fresh charge of particles can be subjected to the pre-foaming operation in the chamber 1, being admitted thereinto as soon as the slide gate or valve 3 is reclosed following the first transfer operation as previously described.

After the stabilization and drying operation has been completed, a suitable slide valve or gate provided at the discharge device 6 is opened and the pre-foamed plastic material particles are extracted from the chamber 2 via the discharge device 6, whereupon they can then be immediately subjected to further processing.

The invention will be more clearly understood from a consideration of the following example.

EXAMPLE

10 Kg of polystyrene beads of particle sizes ranging from about 0.4 to 1.6 mm and having a bulk density of about 550 to 600 $Kg/m^3$, containing 7% pentane as a blowing agent, and having a moisture content of about 0.5%, are charged into the pre-foaming or expanding chamber 1 of the unitary housing 9. The chamber is heated to a wall temperature of about 85° C. by steam blown into the chamber. The polystyrene beads are stirred or agitated in the chamber 1 for 35 seconds by the upper section of the stirring mechanism 4 located in the chamber 1, the mechanism running at a rotary speed of 60 revolutions per minute. During this interval, the temperature of the synthetic material rises to about 110° C.

At the end of the pre-expansion operation, the chamber 1 is evacuated to a residual pressure of 0.8 bar which is substantially equal to the pressure existing in the stabilizing chamber 2. When that condition is reached, the slide gate 3 is opened and the pre-expanded beads are permitted to fall freely from the chamber 1 into the chamber 2. The slide gate then is resealed and the polystyrene beads now in the chamber 2 are there subjected for a period of 35 seconds to a temperature of about 25° to 30° C. and agitated by the lower section of the stirring mechanism running at 60 revolutions per minute, a pressure 0.8 bar being maintained, until the beads are stabilized. Consequently, another batch of polystyrene beads is charged into and pre-expanded in the chamber 1.

The stabilized, pre-foamed polystyrene beads taken from the chamber 2 (at a temperature of about 25° C.) have a bulk density of about 7 to 9 $Kg/m^3$ and particle sizes ranging from about of 4 to 8 mm.

The process according to the present invention leads to the following advantages:

The walls of the chamber 1, which is externally insulated, normally become heated, during a pre-expansion operation, to a temperature between 80° and 100° C. The heating of these walls consumes, in the case of a process characterized by alternating heating and cooling periods, (which are the characteristics of the processes according to the prior art as represented, for example, by U.S. Pat. No. 4,272,469) approximately 20 to 30% of the total energy expended per cycle. It is, therefore, highly desirable to maintain the pre-expansion chamber if at all possible always at an elevated temperature and in each case to charge the fresh material into an already heated environment in the chamber (which is the approach of the present invention) in order to effect the expansion process most economically.

In the conventional processes, furthermore, where the heating or pre-expansion operation and the drying and stabilizing operation are carried out in one chamber, an increased energy consumption of at least 20 to 30% is required as compared with the process of the present invention where separate chambers are used for the two operations.

Still further, in the known processes the expanded material, after leaving the apparatus, loses approximately 10 to 15% of its already attained volume solely by virtue of the effects of ambient atmospheric pressure. The energy requirement for this lost 15% of volume is approximately 9% of the total energy requirements during the foaming operation. The fact that most of the loss of this attained volume is avoided by the process of the present invention (in this process, actually, of the heretofore generally lost 15% of the attained pre-expansion at least 11% is retained) is also a substantial advantage of the invention and results from the fact that the transfer of the particles from the pre-expansion chamber 1 into the stabilizing chamber 2 takes place entirely under vacuum, so that the material is not subjected to any external pressure loading until it is stabilized. By virtue of the special construction of the vacuum chamber, also, a repeated expansion of the particles is possible, because the residual moisture content of the particles can become vaporized even though the temperature is under 100° C., depending on the degree of the vacuum in the chamber.

The period of time during which the material is in the vacuum chamber 2 is the same as the period during which it is in the pre-expansion chamber 1, so that the invention has a further and important advantage in that twice the productivity is achieved with the given volumes of the two chambers relative to the productivity of the single-chamber apparatus of the prior art.

By means of the process of the invention, the pre-foaming and the drying and stabilizing of the plastic materials particles can not only be performed in a single apparatus but it can be performed without any intermediate resting stage, i.e. without any delay between the two operations. This permits the attainment of a time-saving of more than 85% relative to the time (including the time for the drying and stabilizing operation) required for the known pre-foaming processes. Over and above this, the process according to the present invention is also energy-, space- and material-efficient, since the entire operation takes place in a single device so that heat losses are especially minimal.

What I claim is:

1. A process for pre-foaming a volatile liquid blowing agent-containing granular plastic material in which process the granular plastic material is heated by steam and foamed while being stirred, after which the pre-foamed plastic material particles are dried and stabilized, characterized in that the pre-foamed plastic material particles are transferred without an intermediate resting stage from a sealed pre-foaming chamber into a drying and stabilizing chamber, and in that a vacuum is maintained in this chamber during the drying and stabilizing operation.

2. A process according to claim 1, characterized in that the so pre-foamed, dried and stabilized plastic material particles are directly transferred to a further processing stage.

3. A process according to claim 1, characterized in that a vacuum is established in the drying and stabilizing chamber still prior to the introduction of the pre-foamed plastic material particles thereinto.

4. A process according to claim 3, characterized in that the vacuum increased during the drying and stabilizing operation.

5. A process according to claim 1, characterized in that the pre-foamed plastic material particles are stirred during the drying and stabilizing operation.

6. A process according to claim 1, characterized in that the pre-foamed plastic material particles are permitted to fall freely from the pre-foaming chamber into the chamber in which they are dried and stabilized.

7. Apparatus for prefoaming, drying and stabilizing volatile liquid blowing agent-containing granular plastic material comprising: a pre-foaming chamber which is provided with an opening for charging granular plastic material thereinto, a steam inlet opening, a pressure relief valve, a stirring mechanism and a discharge opening for the pre-foamed plastic material particles, characterized in that beneath the pre-foaming chamber there is provided a drying and stabilizing chamber in which the pre-foamed plastic material is to be dried and stabilized and which has a charging opening and a discharge opening, in that the charging opening of the drying and stabilizing chamber is arranged directly under the discharge opening of the pre-foaming chamber, in that the charging opening of the drying and stabilizing chamber is adapted to be hermetically sealed by means of a slide valve, in that a stirring mechanism is provided in the drying and stabilizing chamber, and in that a conduit for a vacuum pump is connected to the drying and stabilizing chamber.

8. Apparatus according to claim 7, characterized in that in the drying and stabilizing chamber at a spacing from the wall thereof there is provided an air-permeable container for receiving the plastic material to be dried and stabilized.

* * * * *